(12) United States Patent
Rodenhouse (10) Patent No.: US 8,336,275 B2
(45) Date of Patent: Dec. 25, 2012

(54) PLASTER/STUCCO APPLICATION AND RESTORATION METHODS AND FASTENER SYSTEM FOR USE IN THOSE AND OTHER METHODS

(75) Inventor: Robert H. Rodenhouse, Grand Rapids, MI (US)

(73) Assignee: Rodenhouse Inc., Grand Rapids, MI (US)

( * ) Notice: Subject to any disclaimer, the term of this patent is extended or adjusted under 35 U.S.C. 154(b) by 2609 days.

(21) Appl. No.: 10/485,613

(22) PCT Filed: Feb. 10, 2003

(86) PCT No.: PCT/US03/03807
§ 371 (c)(1),
(2), (4) Date: Jan. 28, 2004

(87) PCT Pub. No.: WO03/066988
PCT Pub. Date: Aug. 14, 2003

(65) Prior Publication Data
US 2004/0194422 A1 Oct. 7, 2004

Related U.S. Application Data

(60) Provisional application No. 60/355,579, filed on Feb. 8, 2002.

(51) Int. Cl.
*E04G 23/00* (2006.01)
(52) U.S. Cl. .............. 52/741.3; 52/363; 52/368; 52/371; 52/514.5; 52/741.41; 52/745.21; 411/533
(58) Field of Classification Search ................ 52/223.13, 52/309.11, 741.41, 745.21, 361, 362, 364, 52/368, 371, 377, 512, 742.15, 741.3, 742.1, 742.14, DIG. 7, 514, 514.5, 742.13, 363; 411/533, 388, 525, 526, 337; 248/220.21, 248/220.22, 221.11, 222.13, 231.9
See application file for complete search history.

(56) References Cited

U.S. PATENT DOCUMENTS 1,925,774 A 9/1933 Phillips
2,412,744 A * 12/1946 Nelson ........................ 52/745.09
(Continued)

FOREIGN PATENT DOCUMENTS
WO 03060255 7/2003

OTHER PUBLICATIONS

"Walls & Ceilings," Drywall Issue, Omega Products International, Inc., Nov. 2001.
(Continued)

*Primary Examiner* — William Gilbert
(74) *Attorney, Agent, or Firm* — Price Heneveld LLP (57) ABSTRACT

According to the present invention, a fastener system is provided having an anchor (20) and a washer (40). The anchor includes an upset stud shaft (28) to which the washer is attached. The fastener system is preferably used in the inventive method of restoring/applying cladding such as plaster or plaster-like materials such as stucco. According to the inventive method, the anchors of the fastening system are driven into the building structure before application of a moisture barrier membrane. After application of the membrane, a support mesh (90) is secured to the anchors using the washers (40). This allows the membrane to provide a watertight seal around the fasteners. The inventive method may be used in new construction or restoration.

16 Claims, 8 Drawing Sheets

U.S. PATENT DOCUMENTS

| | | | |
|---|---|---|---|
| 2,741,289 A | | 4/1956 | Grow |
| 4,150,465 A | * | 4/1979 | Gavin, Jr. .................. 52/512 |
| 4,318,257 A | * | 3/1982 | Smith ......................... 52/233 |
| 4,331,414 A | | 5/1982 | Wheatley, Jr. |
| 4,619,094 A | * | 10/1986 | Yang ........................... 52/410 |
| 4,740,111 A | * | 4/1988 | Gagnon .................... 405/259.1 |
| 4,842,465 A | * | 6/1989 | Pease et al. ................. 411/337 |
| 4,875,322 A | | 10/1989 | Rozzi |
| 4,959,938 A | | 10/1990 | De Caro |
| 5,054,146 A | * | 10/1991 | Wiesenfeld et al. ........... 470/16 |
| 5,066,181 A | * | 11/1991 | Bogel ......................... 411/383 |
| 5,069,589 A | * | 12/1991 | Lemke ........................ 411/533 |
| 5,207,535 A | * | 5/1993 | Saab ......................... 405/259.1 |
| 5,217,339 A | | 6/1993 | O'Connor et al. |
| 5,483,778 A | | 1/1996 | Scrivener |
| 5,540,023 A | * | 7/1996 | Jaenson ........................ 52/343 |
| 5,908,278 A | * | 6/1999 | Hasan et al. ................. 411/533 |
| 5,979,123 A | | 11/1999 | Brockman |
| 5,987,835 A | | 11/1999 | Sanatrossa |
| 6,035,595 A | | 3/2000 | Anderson |
| 6,122,877 A | | 9/2000 | Hendrickson et al. |
| 6,183,182 B1 | * | 2/2001 | Baumgartner ............... 411/533 |
| 6,295,773 B1 | | 10/2001 | Alty |
| 6,807,786 B1 | * | 10/2004 | Peck .......................... 52/514.5 |
| 2003/0024193 A1 | * | 2/2003 | Schmid ......................... 52/361 |

OTHER PUBLICATIONS

Selected pages of Fastener World, Bimonthly Edition, Issue 76, Sep./Oct. 2002, http://www.fastener-world.com.tw.

* cited by examiner

PLASTER/STUCCO APPLICATION AND RESTORATION METHODS AND FASTENER SYSTEM FOR USE IN THOSE AND OTHER METHODS

CROSS-REFERENCE TO RELATED APPLICATIONS

This application claims, priority under 35 U.S.C. §119(e) on U.S. Provisional Patent Application No. 60/355,579, entitled "Grip-lok screw and washer fastening system," filed on Feb. 8, 2002, by Robert Henry Rodenhouse, the entire disclosure of which is incorporated herein by reference.

BACKGROUND OF THE INVENTION

The present invention generally relates to methods for applying plaster-like materials such as stucco, to a building structure, and for restoring/repairing plaster-like materials on a building structure. The present invention also generally relates to fastener systems for use in the above and other methods.

It is well known in the building construction industry, that water intrusion and moisture entrapment in the wall cavities can lead to structural damage and deterioration of internal building components, and often promote the growth of mold, which presents health related issues. Wind-driven rain, water penetrating through cracks in lamina around door or window frame assemblies, and over-spray from irrigation or lawn sprinkler systems, have been the primary sources of water intrusion. Moisture also may condense inside the wall cavity from temperature differentials. All claddings, such as brick, wood, plaster, plaster-like material such as stucco, exterior insulation finish systems (EIFS), or other materials are designed to repel moisture and use gravity to drain the run-off, thereby protecting the underlying substrate surfaces. All wall cavities are susceptible to potential problems if moisture passes through or behind the lamina. If there are no means for drainage or venting within the wall cavity, the moisture cannot escape and mold may grow within the wall cavity. Certain claddings that have greater "wicking" properties enhance moisture migration. Conversely, certain claddings that have water repellant properties enhance moisture retention.

Various exterior system or stucco manufacturers have developed fluid-applied, water resistant, membranes, which are sprayed, brushed, or rolled on the wall assemblies or underlying substrates to form a moisture barrier. After application, the membranes may be allowed to dry or cure. The membranes have unique properties. The microscopic cells of these moisture barrier membranes prevent moisture from transmitting through from the exterior, but are large enough to allow vapor to pass through and exit in the opposite direction. Thus, moisture cannot penetrate the membrane nor enter into the wall cavity. Conversely, the membrane allows vapor to transmit through, escape, or vent out from the wall cavity. The membrane thus advantageously allows the wall to "breath" yet prevents water intrusion.

Certain claddings, particularly one-coat systems, use fasteners that secure a support mesh such as wire netting or a metal lath. These fasteners are driven into the underlying substrates after application of the moisture barrier membrane. The support mesh is subsequently coated with a plaster or similar stucco material as the exterior cladding. The support mesh thus provides something around which the stucco or plaster material will attach. However, any penetrations through the moisture barrier membrane create potential channels for water intrusion.

If the exterior cladding is traditional 3-coat stucco, "EIFS", one-coat, or similar system, great savings could be derived if the present cladding could be left in place and undisturbed, during repairs. Traditional repair methods concentrated on removal of the cladding, only around the affected area, to expose any hidden damage. This is typically the lower portion of the skirt and directly below window frames, where the migrated water settles at the lowest portion of the building envelope. The exposed wall cavities are air-dried, visible mold is neutralized with bleach, damaged structural framing and sheathing are replaced, and new exterior cladding is reinstalled to blend in with the unaffected facade. These repairs rarely address the cause of water entrapment issues and future problems reoccur soon after repairs are complete.

Building owners demanded permanent solutions to the water intrusion problem because of reoccurring claims. Major damage or second-generation claims, required the entire exterior cladding be removed, so that the repairs could be made and thereafter, new waterproof methods installed. If the entire cladding is removed, tenants and occupants must be relocated due to the dust, noise, exposure to mold spores, and other hazardous issues. Tons of debris added to landfills, including the embedded mold, creates other environmental concerns.

A proprietary restoration system was developed that could completely waterproof the outside building envelope, while keeping much of the existing stucco cladding in place. Like the traditional repair methods, cladding is removed only around the affected area, to expose any hidden damage leaving the original lamina 1 (FIG. 1) intact. This is typically the lower portion of the skirt and directly below window frames, where the migrated water settles at the lowest portion of the building envelope. The exposed wall cavities are air-dried, visible mold is neutralized with bleach, and damaged structural framing 2 and sheathing are replaced. A weep channel 3 is installed at the bottom of the stucco skirt and extends downward over a portion of foundation 4. A new cladding layer 5 is installed where the original cladding was removed. New cladding layer 5 is applied to a thickness corresponding to that of the remaining original cladding 1.

Figure 1:
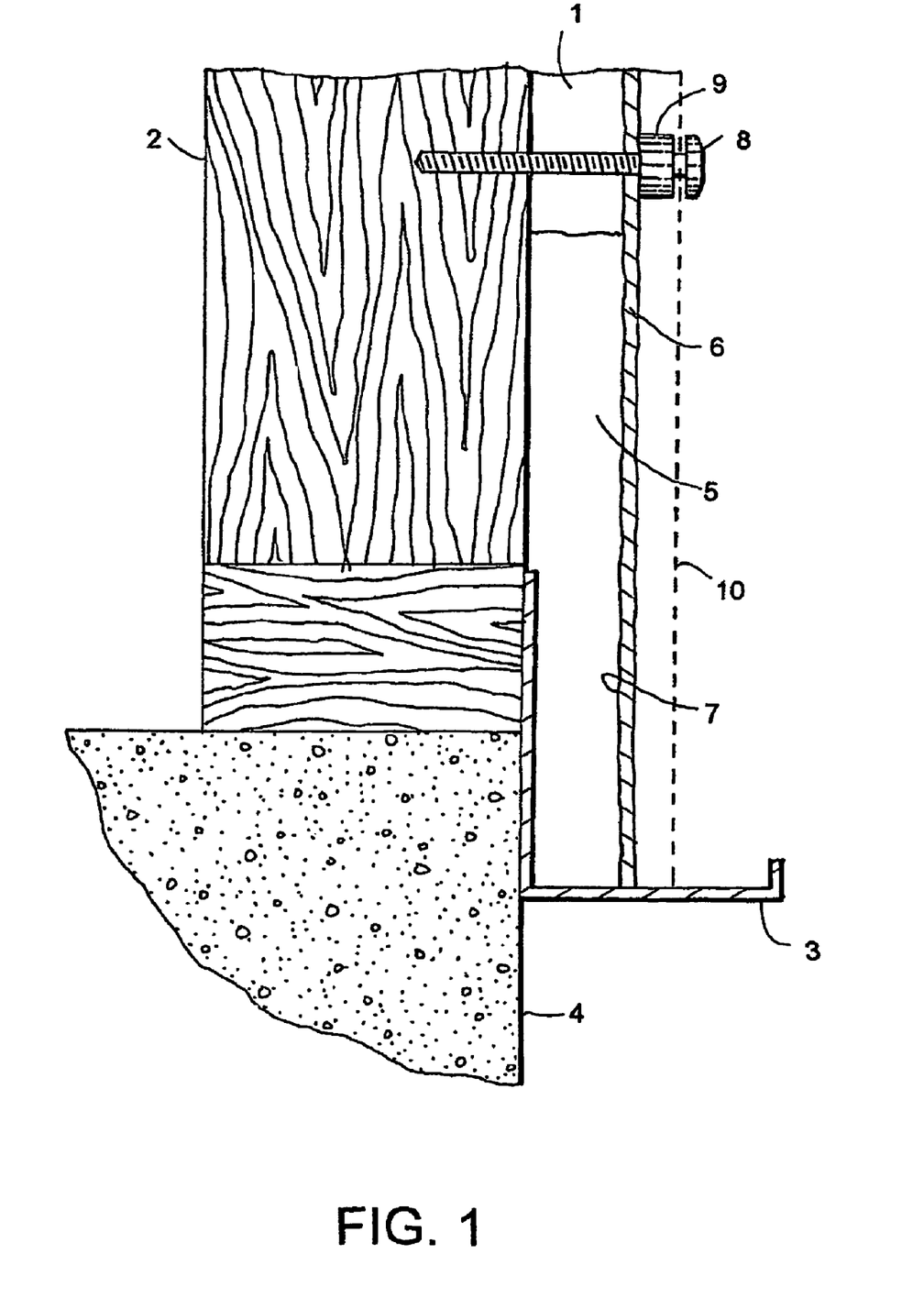
FIG. 1 is an elevational cross-sectional view illustrating a part of a building structure having a partially complete stucco restoration applied according to a proprietary method.
Figure 2:
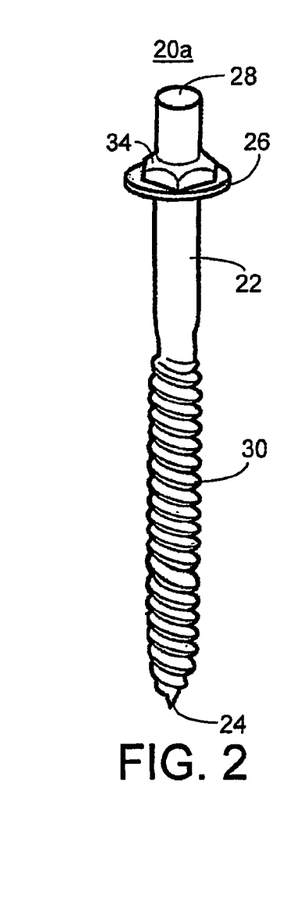
FIG. 2 is a perspective view of a first embodiment of an anchor of the present invention.
Figure 3:
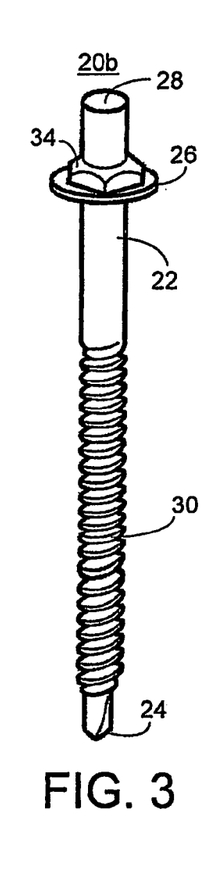
FIG. 3 is a perspective view of a second embodiment of an anchor of the present invention.
Figure 4:
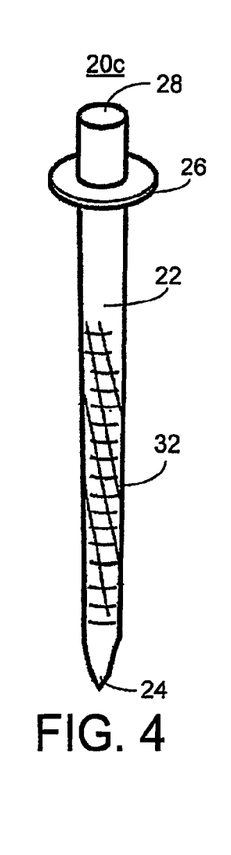
FIG. 4 is a perspective view of a third embodiment of an anchor of the present invention.
Figure 5:
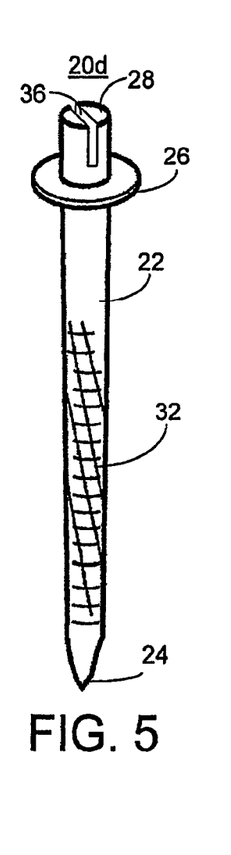
FIG. 5 is a perspective view of a fourth embodiment of an anchor of the present invention.
Figure 6:
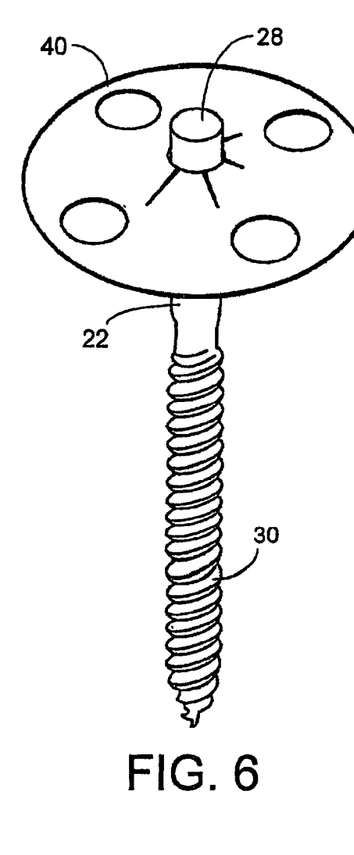
FIG. 6 is a perspective view of the first embodiment of an anchor and a washer.

Next, the entire building envelope is waterproofed with a fluid membrane 6 that is either sprayed, brushed, or rolled over the exposed outer surface 7 of both the original cladding 1 and new cladding layer 5. As explained further below, fasteners 8 having washers 9 are then driven through the moisture barrier 6, new/original cladding (1,5) and into studs 2 of the building structure. A support mesh 10 is then hung on the heads of the fasteners 8.

A new stucco cladding facade (not shown) is then installed over the waterproof membrane 6 and support mesh 10. This process offers a vertical waterproof drainage plane, where liquid moisture collects, drains, and escapes through the weep channel 3 at the bottom of the skirt.

The fastener 8 is an intricate part of this system in that it supports the support mesh 10. (i.e., stucco-wire or lath mesh), which is later embedded within a stucco material or similar plaster type cladding facade. A watertight subsurface is critical in preventing future water intrusion. Uniform and thorough membrane 6 application is paramount to the success of the system. Affixing the stucco-wire 10 before the fluid applied membrane 6 to the old lamina 1, creates void areas where non-protected gaps (from netting and fasteners) shield the subsurface from the applied coating. To prevent the voids, the waterproof membrane 6 must be applied to entire subsurface 7 prior to stucco-wire 10 attachment, to ensure total coverage is achieved. Once the membrane 6 is applied, the new stucco wire or lath mesh 10 is fastened over and through the membrane 6 and subsurface 7. Currently, the fasteners used, to secure the stucco wire through the sealed, waterproof membrane, employ the following methods: a) pneumatic nailers with steel pins shot through large metal washers, b) screws with large attached metal washers, or c) screws 8 with large heads and rubber sealing gaskets 9 (neoprene washers). Both a) and b) designs, create leaks surrounding the penetrations. Even using neoprene washers 9 and screws 8, the c) style, fastening design, was subject to system failure if the rubber washers did not seal properly (due to under/over driven screws or from expansion/contraction of building components).

SUMMARY OF THE INVENTION

According to a first aspect of the invention, a method of applying cladding to a building structure is provided. The method comprises: securing anchors to the building structure; applying a moisture barrier over the building structure after the anchors are secured to the building structure; attaching washers to the anchors; and applying a cladding over the moisture barrier, the washers, and the anchors.

According to another aspect of the present invention, a method of applying cladding to a building structure is provided. The method comprises: securing anchors to the building structure; applying a moisture barrier over the building structure after the anchors are secured to the building structure; hanging and securing a support mesh on the anchors; and applying a cladding over the moisture barrier, the support mesh, and the anchors.

According to another aspect of the present invention, a method of restoring stucco on a building structure is provided. The method comprises: removing a portion of the original stucco; replacing the removed stucco with new stucco to a thickness substantially matching that of the remaining original stucco; securing anchors to the building structure through the original and new stucco; applying a moisture barrier over the original and new stucco after the anchors are secured to the building structure; attaching washers to the anchors; and applying a new layer of stucco over the moisture barrier, the washers, and the anchors.

According to another aspect of the present invention, a fastening system is provided for use in applying cladding to a building structure. The fastening system comprises: an integral anchor comprising: a shaft portion having a first end terminating in a tip and a second end opposite the first end, the shaft portion configured for securing to a portion of the building structure, an integral collar extending radially outward from the second end, and an upset stud shaft portion extending from the collar away from the tip; and a washer having at least two retaining fingers for gripping the upset stud shaft portion of the integral anchor.

According to another aspect of the present invention, an integral anchor is provided for use securing to a building structure. The integral anchor comprises: a shaft portion having a first end terminating in a tip and a second end opposite the first end, the shaft portion being knurled for securing to metal, wood, masonry, and concrete; an integral collar extending radially outward from the second end; and an upset stud shaft portion extending from the collar away from the tip.

According to another aspect of the present invention, a tool is provided for use in applying gripping washers over an upset stud shaft of an anchor of a fastening system. The Tool comprises a handle and a head secured to the handle. The head comprising: a cupped surface for engaging the washer; at least one magnet for holding the washer on the cupped surface; and a central aperture open to the cupped surface for receiving the upset stud shaft of the anchor while the washer is pushed onto the upset stud shaft portion.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as oriented in FIGS. 2-6. However, it is to be understood that the invention may assume various alternative orientations, except where expressly specified to the contrary. It is also to be understood that the specific components illustrated in the attached drawings and described in the following specification are simply exemplary embodiments of the inventive concepts defined in the appended claims. Hence, specific dimensions, proportions, and other physical characteristics relating to the embodiments disclosed herein are not to be considered as limiting, unless the claims expressly state otherwise.

As mentioned above, the present invention pertains to a method of applying/restoring a cladding material such as plaster and other plaster-like materials such as stucco on a building structure. The inventive method utilizes a novel fastening system. Both the novel method and fastening system are described in detail below following a brief overview of the inventive method.

All fastener penetrations create potential for leaks and water intrusion. This is the fault of the fasteners spawling or cracking the underlying existing stucco lamina or substrate, where the previously applied waterproof membrane is unable to bridge or effectively seal the developed penetrations. The inventive method allows all the anchors to be installed before the waterproof membrane is applied. The inventive fastener system includes an integral anchor that penetrates the existing lamina, wood, or gypsum substrate, and secures itself into the wood, steel, masonry, or concrete substructure. This inventive method allows the fasteners and resulting penetrations to be sealed by the membrane. After all the anchors are installed, only the stud shaft portion of the fastener protrudes from the lamina or substrate, which allows the support mesh to be affixed with the gripper washers. Although the same benefits are achieved if the inventive fastener system is used on new construction, the primary value is apparent when employed in restoration of traditional 3-coat stucco, "EIFS", hard coat, one-coat, or similar system. The inventive restoration method is performed in the same manner as disclosed above with respect to FIG. 1 with the exception that novel two-piece fasteners are used with the first portion (i.e., the anchors) driving into the original cladding 1/new cladding layer 5 and studs 2 before applying the waterproof membrane 6. This way, the waterproof membrane 6 seals all spawls, cracks, and penetrations resulting from driving the fasteners. Subsequently, the support mesh is hung and secured using the second portion of the fasteners, namely, the gripping washers. The new lamina facade is then applied over the waterproof membrane, the washers and fasteners, and the support mesh. This precise, sequential process, allows total and uniform coverage of the applied waterproof membrane (over the anchor fastener and its penetration), maintaining the membrane's integrity and function, while the stud portion of the anchor is still able to capture the stucco wire that supports the new overlying stucco cladding.

Figures 7, 11:
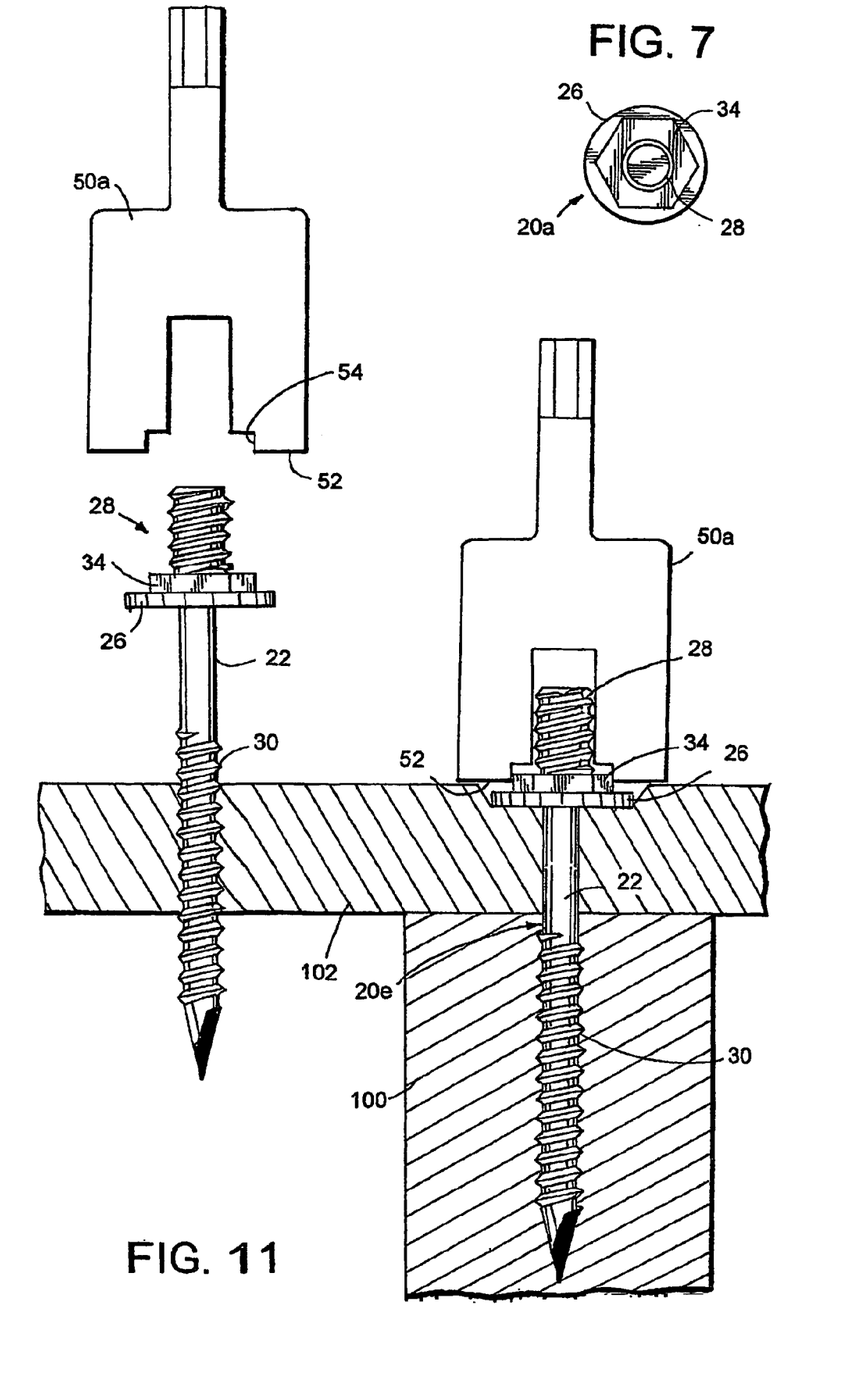
FIG. 7 is a top view of the anchor of the first embodiment.
FIG. 11 is a partial cross-sectional view showing the driving of the inventive anchors into a building structure.
Figure 8:
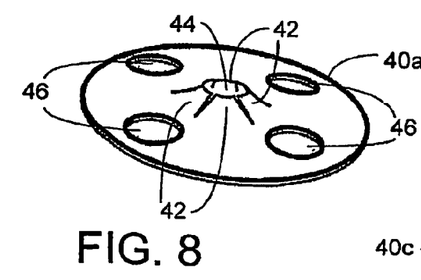
FIG. 8 is a perspective view of a first embodiment of a washer of the present invention.

The novel fastening system includes a unique, two-piece fastener design having a unique anchor and washer. Several different embodiments of the inventive anchor 20 (designated separately as 20a-20d) are shown in FIGS. 2-5. Another embodiment of the anchor (20e) is shown in FIG. 11. Each of the anchors 20 includes a shaft 22 terminating at one end with a tip 24. At an opposite end of the shaft from the tip is an integral collar 26. An upset stud 28 extends from collar 26 in an opposite direction from tip 24. As described further below, upset stud 28 is provided to receive a washer 40 such as the one shown in FIG. 6. Further upset stud 28 extends upward from collar 26 a predetermined distance preferably ⅜ inch) so as to serve as a depth gauge for application of the new cladding. The collar 26 with the protruding stud 28 together offers a visual indication, that the anchor 20 has been engaged to the proper depth. Certain designs require the newly applied stucco cladding must be ½ inch thick. This will cover the top protruding, stud 28 by ⅛ inch and ensures universal and proper stucco coating thickness as the new exterior facade.

The integral collars 26 are provided as a stop for limiting the insertion depth of the anchors. Although collars 26 are shown as being round, they may have any shape, particularly a flower shape when an integral hexagonal drive is included.

Tips 24 may be different for the different embodiments depending upon the material of the building substructure (wood, metal, concrete, masonry, etc.) into which they will be driven, and may be self-tapping. Likewise, anchors 20 may include threads 30 on shafts 22 as shown for anchors 20a, 20b, and 20e (FIGS. 2, 3, and 11) for screwing the anchors into wood, steel, masonry or concrete. Threads 30 are appropriately configured for the building substructure into which they will be driven. If the building substructure is metal, anchors 20c and 20d (FIGS. 4 and 5) preferably do not include threads 30, but rather include knurls 32 on shafts 22 for better engaging the wood, metal, masonry or concrete substructure.

When the anchor includes threads 30, an integral male hexagonal drive head 34 (FIGS. 2, 3, 7, and 11) is preferably provided which extends above collar 26 and is integral therewith. As explained further below, hexagonal drive heads 34 are provided to enable the threaded anchors 20a, 20b, and 20e to be screwed into the building structure. As also described further below, the steel pin anchors 20c and 20d do not have threads 30 and thus do not have hexagonal drive heads 34.

Steel pin anchor 20d differs from pin 20c in that it includes a slot 36. As explained further below, slot 36 provides several benefits depending upon the application with which they are used. Additional advantages of the various above-noted features are outlined further below in connection with the description of their preferred application in stucco application/restoration methods. Although five specific embodiments are shown and described herein, those skilled in the art will appreciate that various modifications may be made to the fastening systems.

The second part of the two-part fastening system is washer 40. Three exemplary embodiments of washers 40 are shown in FIGS. 6 and 8-10 and are designated with reference numerals 40a, 40b, and 40c. Each of the washers 40 include precisely engineered washer retainer fingers 42 surrounding a central aperture 44, optimize quick, exact and positive attachment to the upset stud shaft 28 of the associated anchor 20. Bugle shaped, one-directional, retainer fingers 42 (preferably, 15 degree angle, sloped, pie-shaped, slits—positioned opposite the direction of installation) allow ease of application while offering maximum withdrawal resistance once applied to the anchor's upset stud 28. The concentric fingers 42 grip into the upset stud shaft 28. The locking fingers 42 resist removal because the greater the force applied towards pull-off, the greater the fingers 42 attempt to clinch the upset stud 28.

According to the first embodiment, washer 40a is substantially round. Preferably, the diameter of washer 40a optimizes performance to secure mesh such as a stucco wire. For example, for use in the preferred method, the inventive washer 40a has a 1¼ inch diameter so that the washer 40a captures the 1 inch holes in the stucco wire regardless of screw or pin position and firmly holds the wire netting, while allowing the self furring properties of the wire to act as rebar for the new plaster or stucco. Other prior fasteners have much smaller heads with washers, which require more time to install since position and precision are required to capture the wire.

The washer 40a of the first embodiment also preferably includes precisely engineered washer keyholes 46 that optimize adhesive properties of newly applied stucco or plaster finishes. The design incorporates two or more stucco keyholes 46 to aid bonding characteristics of new stucco to subsurface cladding, through and around washer face. It is desirable that the washer 40 minimizes void cavities. The large through-holes 46 allow the stucco to form around and behind the washer face, thereby locking the aggregate to each other.

Figure 9:
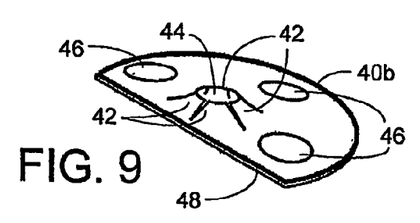
FIG. 9 is a perspective view of a second embodiment of a washer of the present invention.

FIG. 9 shows a washer 40b according to a second embodiment. Washer 40b is similar to washer 40a of the first embodiment except for a truncated edge 48 that can be formed by cutting a portion of washer 40a or bending upward that portion so as to form a straight truncated edge 48. Such a truncated edge 48 may be desirable when the fastening system is used around a door or window frame where use of a larger round washer such as washer 40a would otherwise prevent the positioning of the complete fastening system (i.e., anchor and washer) as close as possible to the window or door jamb extensions or other inside corners where tight tolerances are required.

Figure 10:
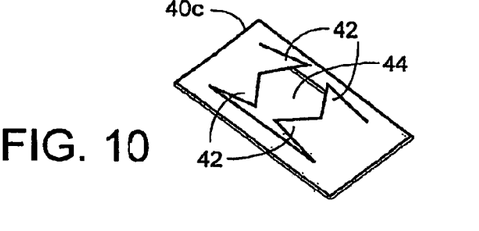
FIG. 10 is a perspective view of a third embodiment of a washer of the present invention.

FIG. 10 shows a washer 40c according to a third embodiment. Washer 40c is shown as being generally rectangular and smaller than the other washers 40a and 40b. Such a smaller washer may be desirable for various applications, and is particularly well-suited for use with the steel pin structure 20d as described further below with reference to FIGS. 21 and 22, but may also be used with anchors 20a and 20b.

It should be noted that although three different washer designs are illustrated and described herein, the washers may have various different shapes and sizes. Moreover, any of the washers may be used with any of the inventive anchors, whether described above or otherwise covered by the claims.

Having generally described the inventive fastening system, the preferred application of those fasteners and the inventive methods of the present invention are now described.

As described above, to waterproof the underlying lamina and effectively attach the new stucco wire (which supports the new cladding), there were two previously known methods to accomplish the process. The first method was to fasten the stucco wire first and apply the waterproof membrane after wire is in place. This method creates void areas or non-protected lamina underneath the heads of the anchors and washers. This method creates channels from the penetrated substrate for water migration and collection of moisture in the wall cavity. The second method was to apply waterproof membrane first and attach the stucco wire over the protected surface at the same time fasteners are driven into the building structure and through the membrane. This method penetrates the membrane, opens the waterproof lamina, and creates a channel for water intrusion from and around the pin or screw thread. This prior method also exposes the fasteners and the penetrated substrate to water migration and collection of moisture in the wall cavity.

The inventive method represents a third and improved method that overcomes the problems associated with the above two methods. Specifically, the inventive two-piece fastener system allows the anchor 20, which serves as the support bracket for the stucco wire, to be installed first. The waterproof, fluid applied, membrane is then applied over installed anchors. The exposed profile of the upset stud shaft 28 is minimal and allows total coverage and full integrity of the waterproof membrane. This new method provides that the inventive anchors are applied before the waterproofing membrane, thereby allowing all penetrations to be sealed and insuring integrity of the sealed subsurface.

An improved female drive bit 50 (FIG. 11) was engineered as an improvement over internal or external drives on the upset stud shaft 28. Internal or external drives on the upset stem can "cam-out", "spawl-out", or round off drive nut corners due to severe torque conditions imposed during driving forces. This not only deters drivability, but also removes the protective, galvanized coating on the screw anchor 20. The result could expose unprotected metal to corrosive conditions, inherent in the acidic, stucco chemicals. Rust from the corroded driver area (that is just below the new surface lamina), could bleed through the stucco color finish coat, result in unsightly streaks, and/or possible fastener failure.

Figure 12:
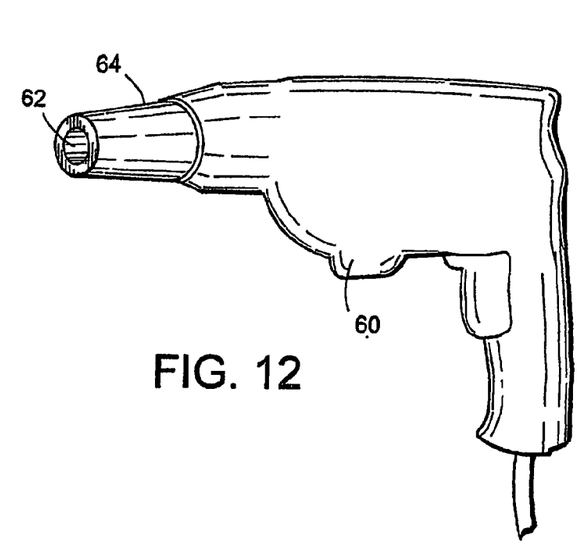
FIG. 12 is a perspective view of a drill gun for use in driving the inventive anchors.

The matching 5/16" hex drive bit 50 mates with the hex nut 34, collar 26, and 3/8" upset stud shaft 28 for an exact, positive, engagement. The 5/16" hex drive-nut, intricate with the collar base 26, ensures optimum and positive engagement of the anchor. The "female" drive bit 50a is precisely engineered to conform to the exact shape of the "male" screw anchor profile. This holds the anchor 20e tightly in the opening 62 of the drive-chuck 64 of a drill gun 60 (FIG. 12) to eliminate fastener "wobble" and positively, efficiently, and expeditiously engage into the stucco cladding, hard surfaces, and associated substrates.

As shown in FIG. 11, as the screw anchor 20e engages into the substrate 100, the collar 26, when set into the old stucco lamina 102, helps seal the threads that has penetrated through the old stucco cladding. The sealed collar will countersink into the old stucco lamina assuring automatic and predetermined (measured/proper) depth control has been attained. As shown in FIG. 11, once the anchor 20e has reached a predetermined depth, the end surface of bit 50a engages the old stucco lamina 102 and the female hex drive of bit 50a eventually becomes disengaged with the male hex nut drive 34 of the screw anchor 20e. Although the embodiment of the anchor 20e is shown in FIG. 11 as having a threaded upset stud shaft 28, it will be appreciated that the stud shaft 28 may be relatively smooth or unthreaded as shown in the prior anchor embodiments.

Figure 13:
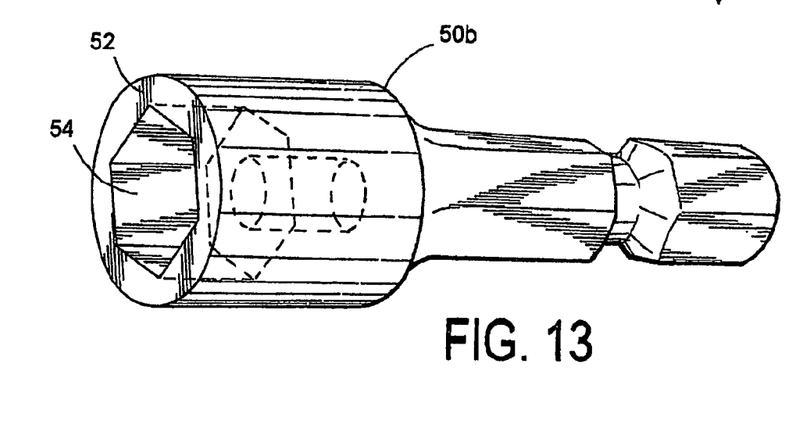
FIG. 13 is a perspective view of an inventive drill bit for use in driving the inventive anchors.
Figure 14:
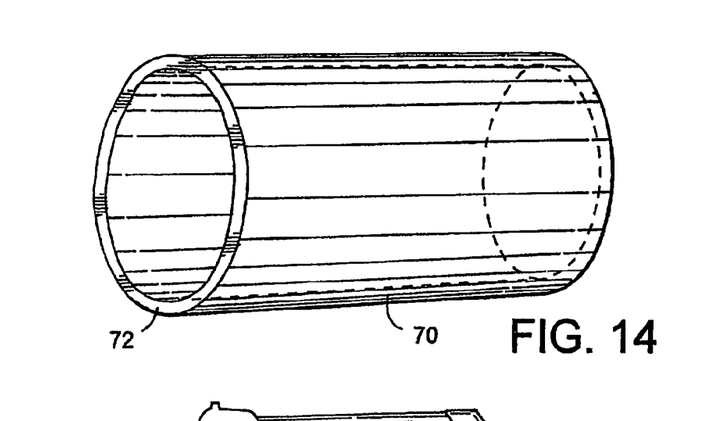
FIG. 14 is a perspective view of a depth-gauge nose adaptor for use in driving the inventive anchors.

FIG. 13 shows a second embodiment of a female hex drive bit 50b, which is similar in construction to bit 50a with the exception that the female hex drive portion 54 of bit 50b is deeper than the corresponding portion in the first embodiment. Bit 50b is preferably used with a clutch-style adjustable drill gun tool (resembling drill gun 60) and having a depth gauge nose adjuster corresponding to element 64. The outer diameter of bit 50b is smaller and corresponds to that of collar 26 of anchor 20. Thus, to help control the depth of insertion, a depth-gauge nose adaptor 70 (FIG. 14) is attached over depth gauge nose adjuster 64 and around bit 50b, such that the end 52 of bit 50b coincides with the end 72 of depth gauge nose adapter 70. The face (nose) 72 of the depth-gauge nose adaptor 70 will contact and stop at the stucco surface. While continuing to turn into the stucco surface, the screw anchor 20 will draw away and out of the driver's clutch from the drill gun 60, thereby, terminating the turning or driving action. As the driver stops engaging, at the determined travel depth, the screw 20 will leave the exposed, protruding stud shaft 28, the exact height for the washer 40 to affix. The released upset stud shaft 28 will automatically maintain 3/8" height above the stucco surface profile to serve as the aforementioned depth guide.

As the anchor 20 engages into the substrate 100, the collar 26, helps seal the threaded shaft portion 22 of the anchor 20 that has penetrated through the old stucco cladding 102. The sealed collar 26 will countersink into the old stucco lamina 102 or new substrate 100, assuring automatic and predetermined (measured/proper) depth control has been attained.

Figure 15:
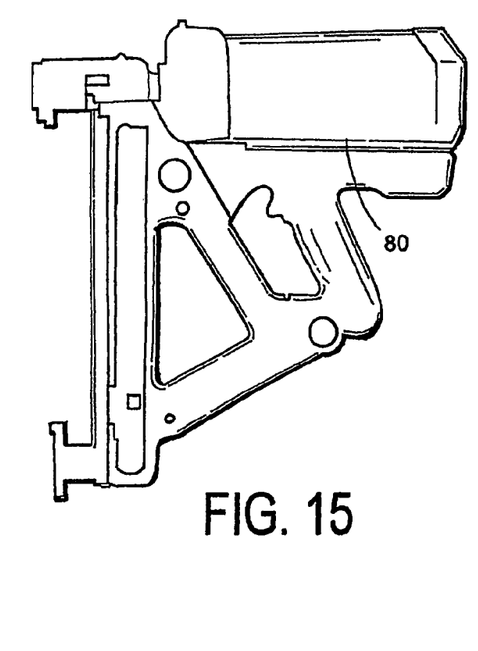
FIG. 15 is a perspective view of a pneumatic driver for use in driving the inventive anchors.

The face (nose) 72 of the depth-gauge nose adaptor 70 will contact and stop at the stucco surface 102. As the pneumatic driver 80 (FIG. 15) or clutch adjustable screw-gun 60 stops at the determined travel depth, the anchor 20 will leave the exposed, protruding stud shaft 28 the exact height for the washer 40 to affix. The released upset stud shaft 28 will automatically maintain ⅜" height above the stucco surface profile 102. Depth-gauge nose adapter 70 may be used with either drill gun 60 or pneumatic driver 80.

Figure 16:
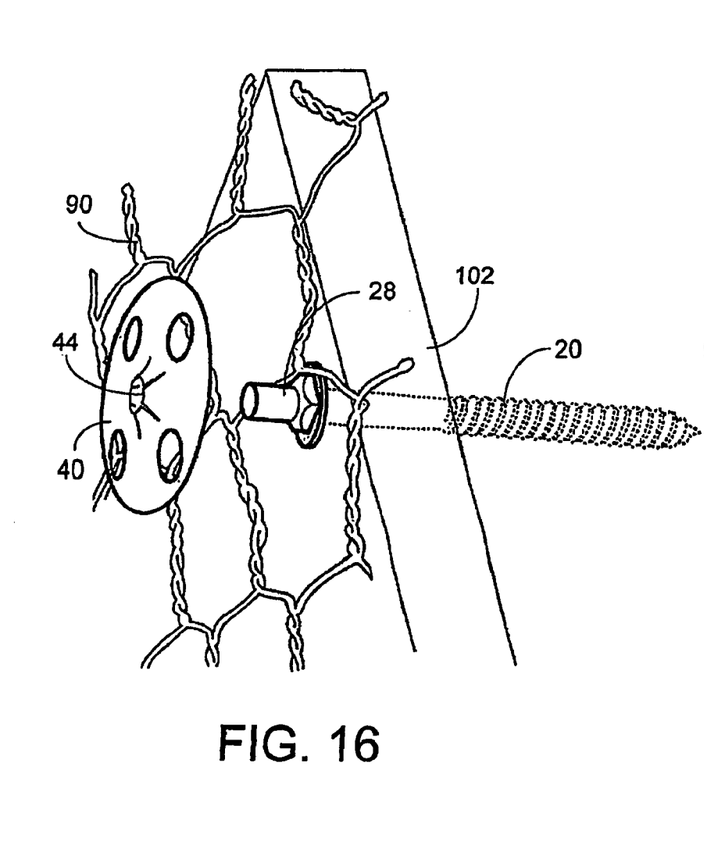
FIG. 16 is a perspective view showing use of the inventive fastening system in the inventive method.
Figure 17:
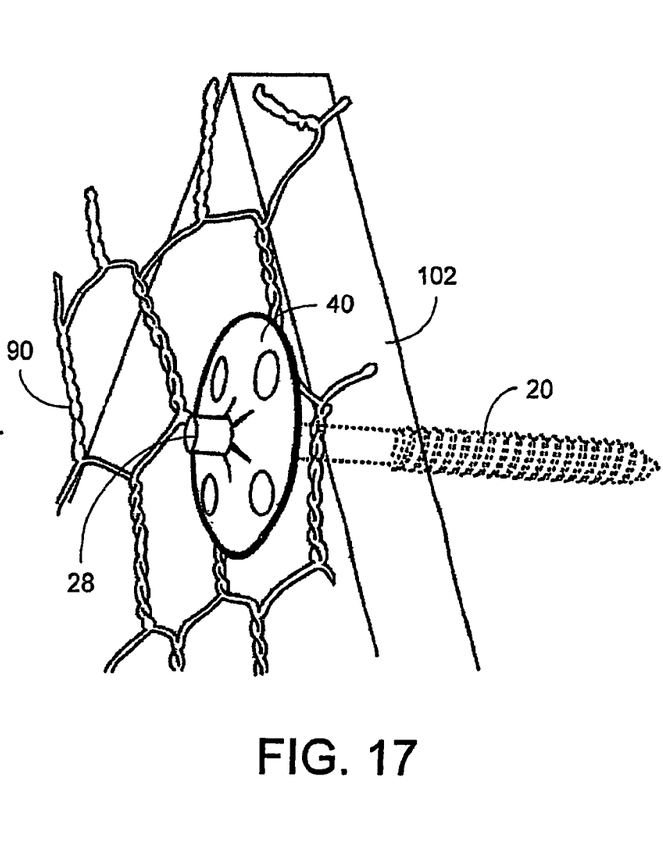
FIG. 17 is a perspective view showing use of the inventive fastening system in the inventive method.
Figure 18:
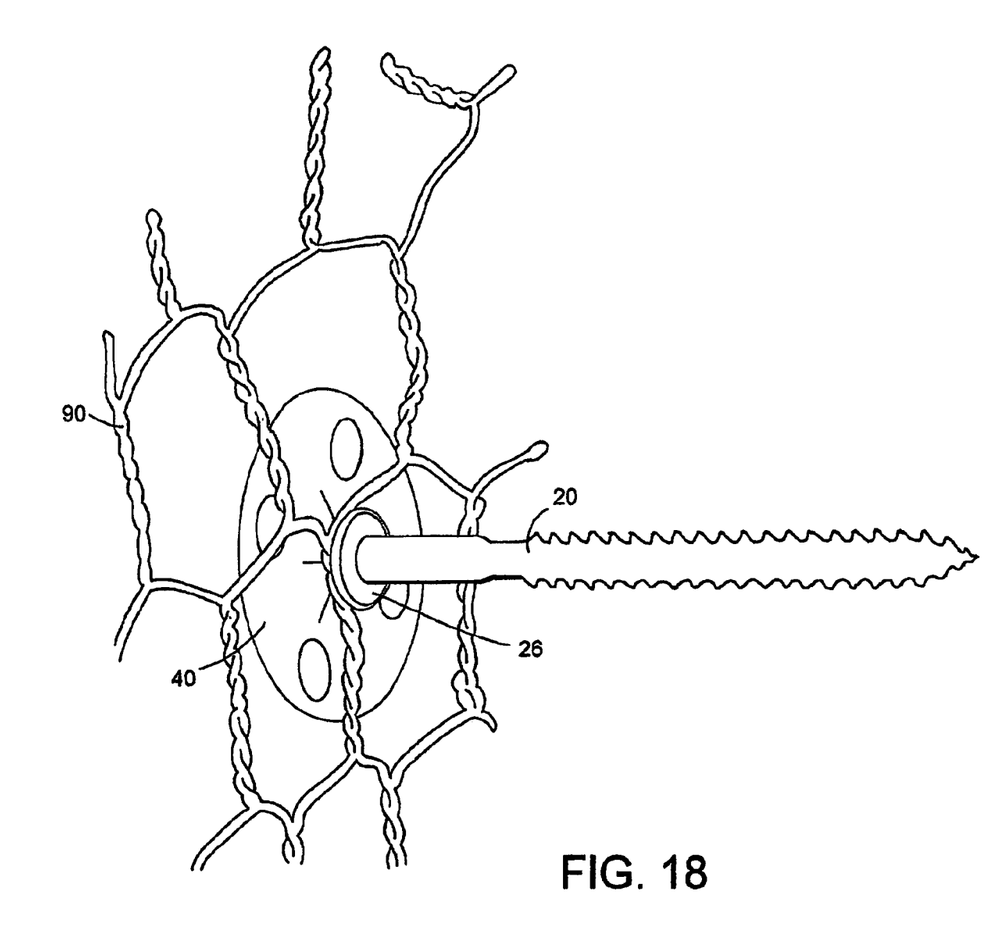
FIG. 18 is a perspective view showing use of the inventive fastening system in the inventive method.

The anchors 20 are preferably secured to the building structure (whether it is to the substructure or old cladding) every six inches vertically along each building stud. Once all the anchors are secured, the moisture barrier is applied to the building structure and over and around the anchors 20. Subsequently, as shown in FIG. 16, a support mesh 90, such as stucco wire or metal lath, is hung on the anchors 20 and washers 40 are attached such that the upset stud shaft 28 of each anchor extends through central aperture 44 in an associated washer 40 such that the retaining fingers 42 grip the stud shaft 28 as shown in FIG. 17. As shown in FIGS. 16-18, the size of the washer 40 is preferably sufficiently larger than the openings in support mesh 90 to ensure that the washers ensnare and secure the support mesh 90. Washers 40 and support mesh 90 are installed after waterproofing material (liquid membrane) is applied to existing cladding and subsurface 102. This method allows better preparation and added insurance guaranteeing that the liquid membrane is adequately covering the substrate 102 and fully protecting against water migration, intrusion, and collection of moisture in the wall cavity.

Figure 19:
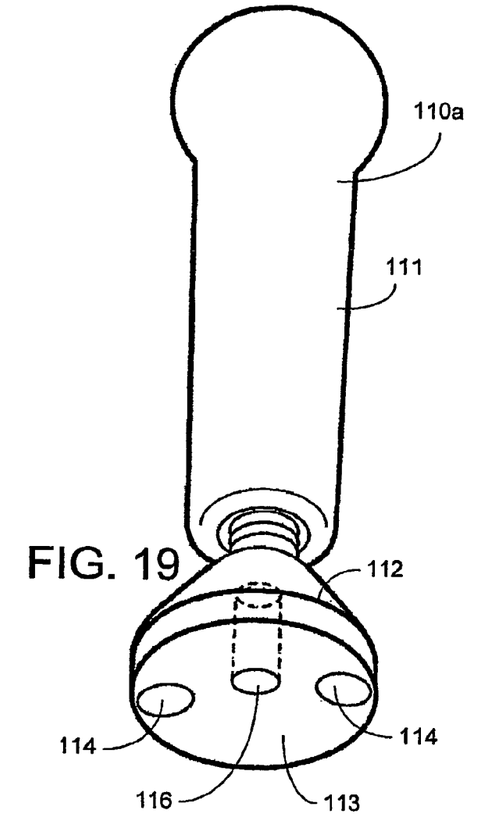
FIG. 19 is a perspective view of a tool for attaching the inventive washers.

Preferably, a tool 110 such as that shown in FIG. 19 is used to press the washers 40 onto the anchors 20. As shown, tool 110 includes a handle 111 and a head 112 having a cupped surface 113 corresponding to the bulging top surface of the washers 40. The head 112 includes a central aperture 116 opening in the cupped surface for receiving the upset stud shaft 28 of an anchor 20. Head 112 further includes one or more magnets 114 for holding a washer 40 to the surface 113 of head 112. Head 112 is preferably sized to correspond to the outer dimensions of the washer to enhance the ease of centering the washers 40 on surface 113 such that central apertures 44 and 116 of the washers and tool align.

Figure 20:
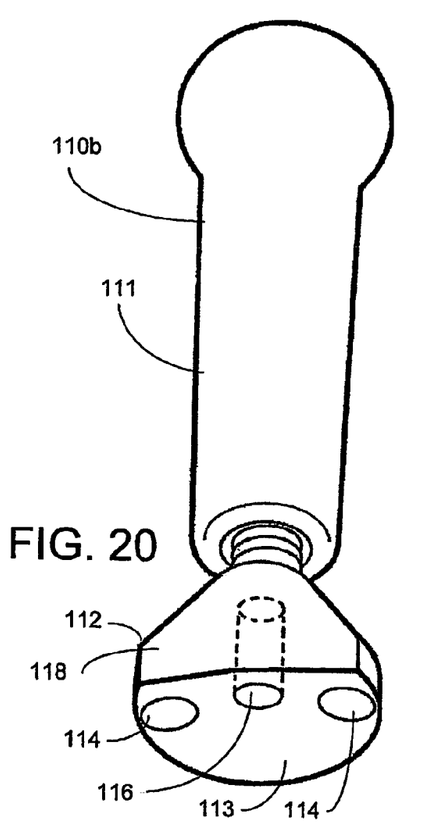
FIG. 20 is a perspective view of a tool for attaching the inventive washers.

FIG. 20 shows an alternative tool 110b, which is similar to tool 110 of FIG. 19 with the exception that head 112 of tool 110b has a truncated side 118 to correspond to truncated edge 48 of washer 40b (FIG. 9). This allows the tool 110b to press the truncated washer 40b when in close proximity to a window or door frame.

Figure 21:
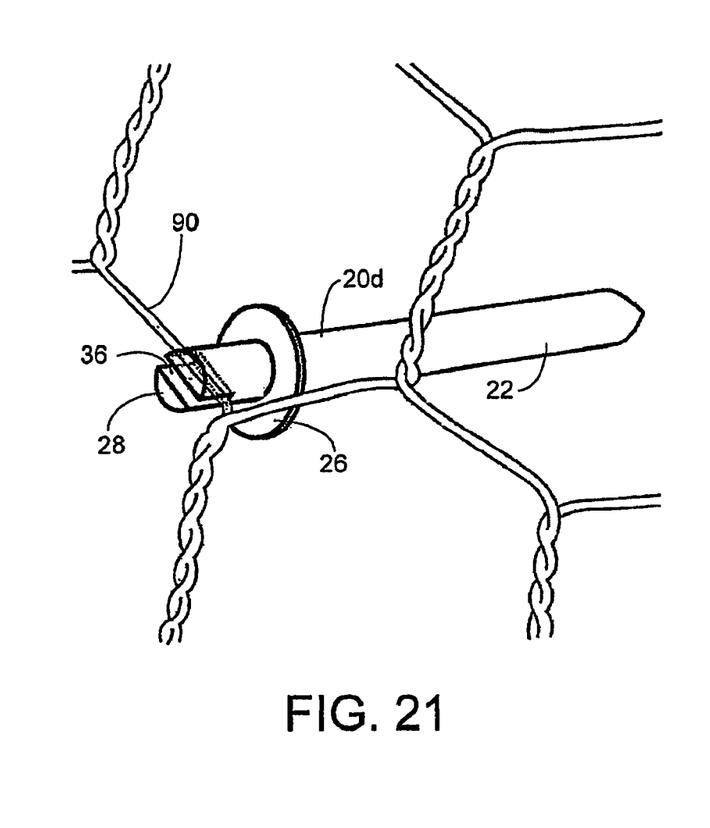
FIG. 21 is a perspective view showing use of the inventive fastening system in the inventive method.
Figure 22:
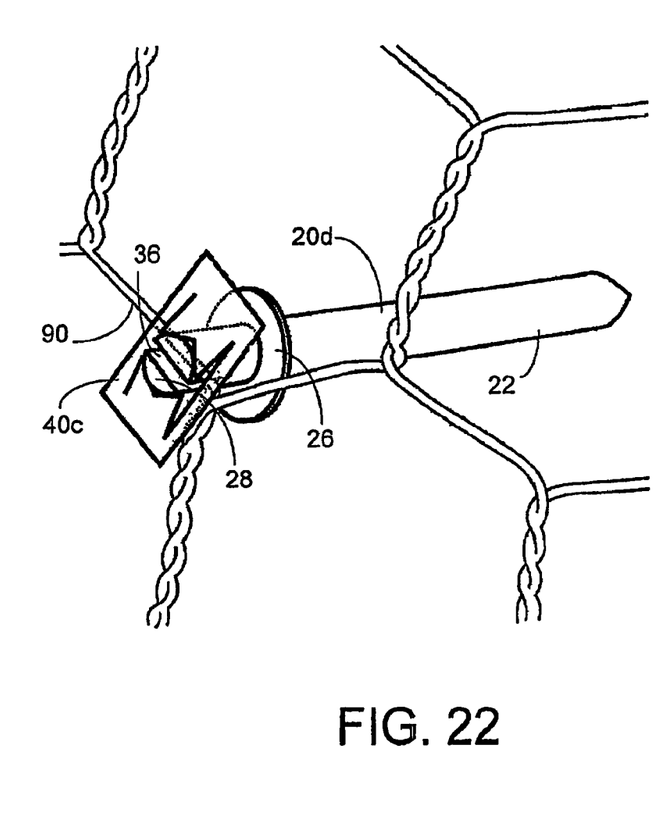
FIG. 22 is a perspective view showing use of the inventive fastening system in the inventive method.

FIGS. 21 and 22 show the use of steel pin anchor 20d and washer 40c to secure support mesh 90. As shown, anchor 20d is driven into the building structure and then support mesh 90 is hung by pushing a wire of the mesh into slot 36 of anchor 20d. Then washer 40c is attached so as to secure the wire of the mesh within slot 36. This embodiment allows washers to be utilized that are smaller than the openings in the support mesh 90. It should be appreciated that by utilizing anchor 20d having slot 36, the need for the washers may be eliminated by pinching the sides of upset stud shaft 28 to close slot 36 over the wire of support mesh 90. The depth of the slot 36 may be one half the length of upset stud shaft 28 or any other depth preferably less than the full length of upset stud shaft 28. This allows the wire mesh to be supported in spaced relation from the outer surface of the waterproof membrane which advantageously allows the cladding material to better flow under and around the wire mesh.

Although the inventive method has been described with respect to repairing stucco on an existing building structure, the method is equally applicable to application of new stucco or other cladding material in newly constructed building structures. Likewise, the method may be used for repair of cladding materials besides stucco, such as plaster and other plaster like cladding materials.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

What is claimed is:

1. A method of restoring stucco on a building structure comprising:
   removing a portion of original stucco;
   replacing removed original stucco with new stucco to a thickness substantially matching that of any remaining original stucco;
   securing anchors to the building structure through the original and new stucco;
   applying a moisture barrier material over the original and new stucco after the anchors are secured to the building structure to provide a moisture barrier that is free of hole formed by penetration of anchors;
   attaching washers to the anchors;
   applying a new layer of stucco over the moisture barrier, the washers, and the anchors; and
   hanging support mesh on the anchors, wherein the washers are attached to the anchors after the support mesh is hung so as to secure the support mesh to the building structure, and wherein the new layer of stucco is applied over the support mesh.

2. The method of claim 1, wherein the moisture barrier is applied before the support mesh is hung and before the washers are attached to the anchors.

3. The method of claim 1, wherein at least some of the washers have a size that is larger than openings in the support mesh.

4. A method of restoring stucco on a building structure comprising:
   providing new stucco;
   removing a portion of original stucco;
   replacing removed original stucco with new stucco to a thickness substantially matching that of any remaining original stucco;
   securing anchors to the building structure through the original and new stucco;
   applying a moisture barrier material over the original and new stucco after the anchors are secured to the building structure to provide a moisture barrier that seals spawls, cracks and penetrations resulting from securing the anchors to the building structure;
   hanging support mesh on the anchors after the moisture barrier is applied;
   attaching washers to the anchors after the support mesh is hung so as to secure the support mesh to the building structure; and
   applying a new layer of new stucco over the support mesh, the washers, and the anchors, wherein the new layer of new stucco is also applied over the moisture barrier such that the moisture barrier is between the new layer of new stucco and the remaining original stucco.

5. The method of claim 4, wherein the anchors have screw threads and the anchors are screwed into the building structure.

6. The method of claim 4, wherein the anchors include a collar proximate a drive end thereof, the anchors include a first shaft portion terminating in a tip, and a second shaft portion extending from the collar away from the tip.

7. The method of claim 6, wherein the second shaft portion is not threaded.

8. The method of claim 6, wherein the second shaft portion has a length defining a depth guide for applying the new layer of new stucco.

9. The method of claim 6, wherein the washers have an aperture, wherein the washers are attached to the anchors by pressing each washer onto an anchor such that the second shaft portion of the anchor extends through the aperture in the washer.

10. The method of claim 4, wherein at least some of the washers have a size that is larger than openings in the support mesh.

11. The method of claim 4, wherein the anchors are integral anchors that each comprise:
a shaft portion having a first end terminating in a tip and a second end opposite the first end, the shaft portion configured for securing to a portion of the building structure;
an integral collar extending radially outward from the shaft portion at a distance from the second end; and
an upset stud shaft portion disposed between the collar and the second end and extending from the collar away from the tip,
wherein the washers are attached to the upset stud shaft portions of the anchors.

12. The method of claim 4, wherein the moisture barrier is free of holes formed by penetration of the anchors.

13. The method of claim 4, wherein the moisture barrier covers the anchors.

14. A method of restoring stucco on a building structure comprising:
providing new stucco;
removing a portion of original stucco;
replacing removed original stucco with new stucco to a thickness substantially matching that of any remaining original stucco;
providing integral anchors, the integral anchors each comprising:
a shaft portion having a first end terminating in a tip and a second end opposite the first end, the shaft portion configured for securing to a portion of the building structure,
an integral collar extending radially outward from the shaft portion at a distance from the second end, and
an upset stud shaft portion disposed between the collar and the second end and extending from the collar away from the tip;
securing the integral anchors to the building structure through the original and new stucco;
applying a moisture barrier material over the original and new stucco after the integral anchors are secured to the building structure to provide a moisture barrier that is free of holes formed by penetration of anchors;
hanging support mesh on the upset stud shaft portions of the integral anchors after the moisture barrier is applied;
attaching washers to the upset stud shaft portions of the integral anchors after the support mesh is hung so as to secure the support mesh to the building structure, wherein the washers have an aperture and at least two retaining fingers for gripping the upset stud shaft portion of an integral anchor, wherein the washers are attached to the integral anchors by pressing each washer onto an anchor such that the upset stud shaft portion of the integral anchor extends through the aperture in the washer and the at least two retaining fingers grip the upset stud shaft portion of the integral anchor; and
applying a new layer of new stucco over the support mesh, the washers, and the integral anchors, wherein the new layer of new stucco is also applied over the moisture barrier such that the moisture barrier is between the new layer of new stucco and the remaining original stucco.

15. The method of claim 14, wherein the moisture barrier seals spawls, cracks and penetrations resulting from securing the anchors to the building structure.

16. The method of claim 14, wherein the moisture barrier covers the anchors.

* * * * *